US009801433B2

(12) United States Patent
Murphy

(10) Patent No.: US 9,801,433 B2
(45) Date of Patent: Oct. 31, 2017

(54) JEWELRY DISPLAYING CREMATION ASHES IN A TRANSPARENT OR TRANSLUCENT RESIN SETTING AND METHOD OF MAKING SAME

(71) Applicant: Gina Murphy, Huntington Beach, CA (US)

(72) Inventor: Gina Murphy, Huntington Beach, CA (US)

( * ) Notice: Subject to any disclaimer, the term of this patent is extended or adjusted under 35 U.S.C. 154(b) by 0 days.

(21) Appl. No.: 15/265,496

(22) Filed: Sep. 14, 2016

(65) Prior Publication Data

US 2017/0000224 A1    Jan. 5, 2017

Related U.S. Application Data

(62) Division of application No. 14/159,691, filed on Jan. 21, 2014, now abandoned.

(60) Provisional application No. 61/844,798, filed on Jul. 10, 2013.

(51) Int. Cl.
| | |
|---|---|
| *A44C 9/00* | (2006.01) |
| *A44C 27/00* | (2006.01) |
| *A61G 17/007* | (2006.01) |
| *A61G 17/08* | (2006.01) |
| *B29B 7/00* | (2006.01) |
| *B29C 37/00* | (2006.01) |
| *B29C 70/68* | (2006.01) |
| *B29C 70/74* | (2006.01) |
| *C08K 11/00* | (2006.01) |
| *B29K 105/00* | (2006.01) |
| *B29K 511/00* | (2006.01) |
| *B29L 31/00* | (2006.01) |

(52) U.S. Cl.
CPC .............. *A44C 9/0069* (2013.01); *A44C 9/00* (2013.01); *A44C 9/0053* (2013.01); *A44C 27/001* (2013.01); *A61G 17/007* (2013.01); *A61G 17/08* (2013.01); *B29B 7/005* (2013.01); *B29C 37/0028* (2013.01); *B29C 70/682* (2013.01); *B29C 70/745* (2013.01); *C08K 11/00* (2013.01); *B29K 2105/0005* (2013.01); *B29K 2511/00* (2013.01); *B29L 2031/743* (2013.01)

(58) Field of Classification Search
CPC ....... A44C 9/0069; A44C 9/00; A44C 9/0053; A44C 27/001; A61G 17/007; A61G 17/08; B29B 7/005; B29C 37/0028; B29C 70/682; B29C 70/745; C08K 11/00; B29K 2105/0005; B29K 2511/00; B29L 2031/743
USPC ............................ 27/1; 63/15, 1.14; 264/268
See application file for complete search history.

(56) References Cited

U.S. PATENT DOCUMENTS

| | | | |
|---|---|---|---|
| 1,383,104 A | 6/1921 | Grossman | |
| 5,732,862 A | 3/1998 | Bull | |
| 6,382,111 B1 * | 5/2002 | Hojaji | B09B 3/0025 110/341 |
| 6,536,235 B2 | 3/2003 | Lovegrove | |

(Continued)

FOREIGN PATENT DOCUMENTS

| | | | | |
|---|---|---|---|---|
| DE | 102005058486 A1 | 6/2007 | | |
| GB | 2468709 A | * 9/2010 | ............. | A61B 17/08 |

(Continued)

*Primary Examiner* — William Miller
(74) *Attorney, Agent, or Firm* — Fulwider Patton LLP

(57) ABSTRACT

A method including the selection of a piece of jewelry with a setting, and inserting a mixture of transparent resin and cremation ashes in the setting.

7 Claims, 6 Drawing Sheets

(56) References Cited

U.S. PATENT DOCUMENTS

| | | | |
|---|---|---|---|
| 6,615,463 B1 * | 9/2003 | Hojaji | B09B 3/0025 110/341 |
| 7,228,602 B2 * | 6/2007 | Weisbrot | A44C 17/00 264/234 |
| 7,266,866 B2 * | 9/2007 | Vogel | B09B 3/005 110/341 |
| 8,281,465 B1 | 10/2012 | Miraldi | |
| 8,627,555 B2 * | 1/2014 | Kennedy | A61G 17/08 27/1 |
| 2002/0025392 A1 * | 2/2002 | Yardley | C03B 1/00 428/3 |
| 2003/0154581 A1 * | 8/2003 | Jain | A61G 17/08 27/1 |
| 2008/0209945 A1 | 9/2008 | Blevins | |
| 2009/0266108 A1 | 10/2009 | Balme et al. | |
| 2010/0005835 A1 | 1/2010 | Johnson, Sr. et al. | |
| 2010/0199476 A1 * | 8/2010 | Cummings | A61G 17/08 27/1 |

FOREIGN PATENT DOCUMENTS

| | | | | |
|---|---|---|---|---|
| GB | 2473419 A | * | 3/2011 | A44C 25/00 |
| JP | 3190868 U | * | 6/2014 | |
| NL | 1032456 C6 | * | 3/2008 | |

* cited by examiner

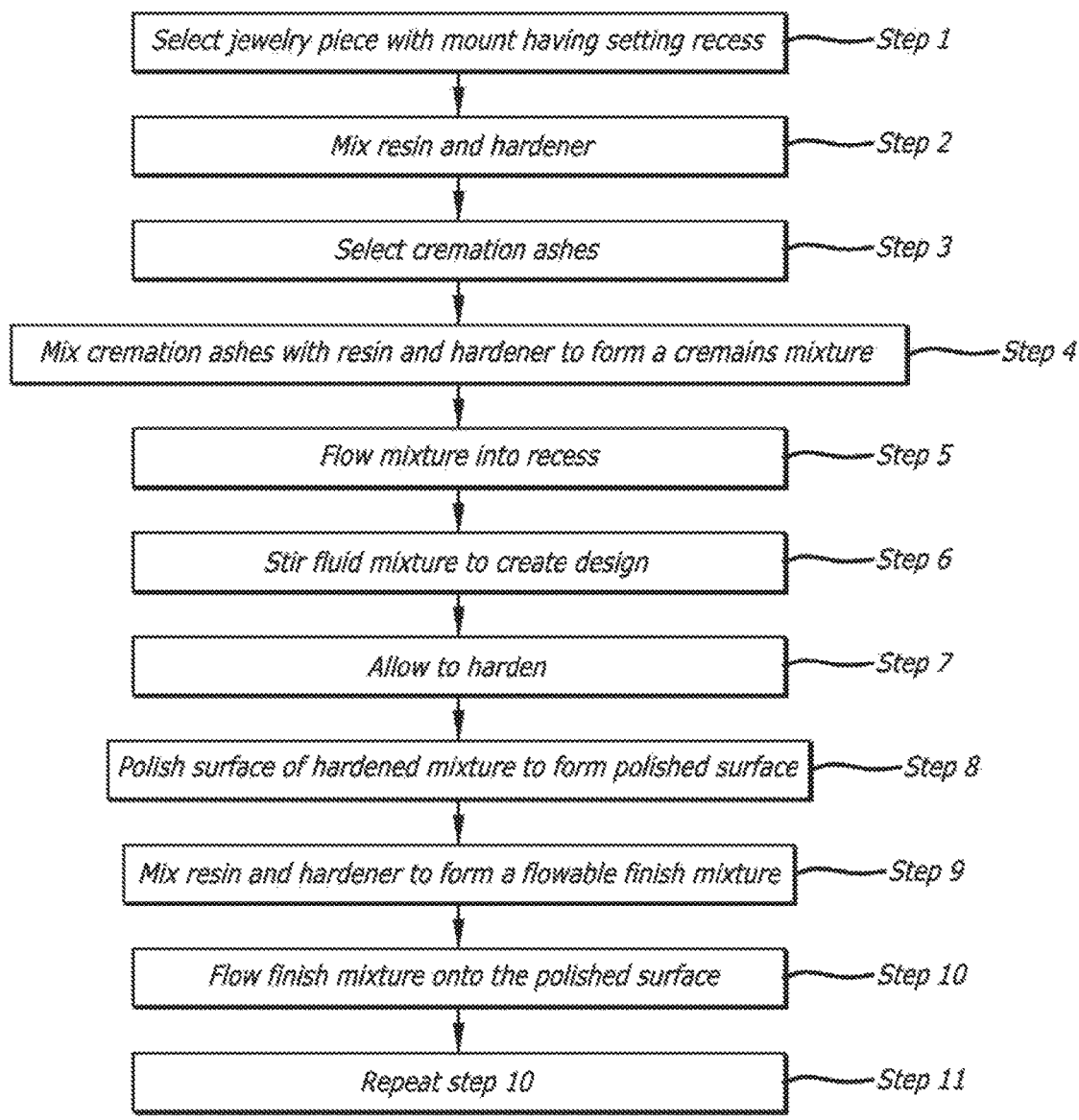

JEWELRY DISPLAYING CREMATION ASHES IN A TRANSPARENT OR TRANSLUCENT RESIN SETTING AND METHOD OF MAKING SAME

CROSS-REFERENCES TO RELATED APPLICATIONS

This application is a divisional of copending U.S. application Ser. No. 14/159,691, filed Jan. 21, 2014, which claims priority from U.S. application Ser. No. 61/844,798, filed Jul. 10, 2013 incorporated by reference in its entirety.

BACKGROUND

Field of the Invention

The present invention relates to mementos for recalling and respecting loved ones who have passed.

Description of the Prior Art

There has long been a demand for mementos or keepsakes to allow survivors to feel close to and recall the memories of loved ones, including pets, who are no longer with us. Traditionally, the remains of the deceased were often interned in a human or pet cemetery and that resting place would be visited on a regular basis by the heirs and survivors.

In more recent times, with the lack of space and more modern thinking, cremation of humans and animals alike has become so common place that up to nearly fifty percent of all remains are now being cremated to produce what is referred to as cremains.

Various different devices and methods have been originated for preserving cremation ashes such as in urns, sometimes maintained in the survivor's household or possibly interned at a local cemetery. Other efforts have led to the proposal of devices which would allow the deceased's ashes to be housed in a piece of jewelry or the like. For instance, locket compartments have been proposed which carry a small quantity of cremation ashes, so the ashes can be viewed in their unaltered states. It has also been proposed to encase a small quantity of cremation ashes in molten glass formed into a jewelry piece to be worn, for instance, around the neck or wrist of a loved one.

Lockets for receiving cremains have certain appeal but suffer the shortcoming that the ashes are not exposed for instantaneous and ready viewing by the wearer and can sometimes become dislodged and lost.

Encasement of cremains in glass can provide for convenient display and viewing through the glass itself but suffers the shortcoming that typically the resultant glass piece must be of considerable size and the ashes sometimes have a rather dark, grey, dull appearance which may not be particularly appealing to the viewer.

It is known that cremation to oxidize human remains typically produces a somewhat unattractive grey and dull appearance. This shortcoming has been recognized in U.S. Pat. No. 7,255,743 to VandenBiesen et al. There, the inventor seeks to overcome this shortcoming by extracting carbon from the ashes to be exposed to a high temperature and pressure process to produce a keepsake diamond. While serving to produce a durable and somewhat attractive memento, this process is prohibitively expensive and ends up altering the appearance of the ashes from their natural state, something that is preferred by many survivors.

Conventional jewelry, such as finger rings, necklaces, bracelets, cufflinks, pendants, charms, wrist watches and the like are often worn for aesthetic purposes and provide a ready expedient for mounting cremains, subject to a satisfactory medium available to mount the cremains. The mounting of cremains in a small piece of jewelry, however, presents challenges and has thus left those working in the art with the dilemma of either accepting the commonplace display of the cremains in an urn, embedded in pottery or the like or possibly encased in transparent glass by a molten torch procedure or wearing oversized jewelry to display the cremains in a glass encasement.

It has been proposed to grow a pearl with cremated remains by creating a nucleus containing cremated remains with a transition layer pre-formed in hemispheres and formed from mollusc shell, byronite, calcium carbonate, or suitable glass material. The hemispheres are formed with composite material, two hemispheres bonded together with an adhesive. The resulting nucleus is placed in the mollusc. After the mollusc has deposited nacre to enshroud nucleus, a pearl containing cremated remains is harvested. A method of this type is disclosed in U.S. Patent Publication No. 2010/0005835, filed Jul. 9, 2009 by Johnson. This method is extremely expensive and time consuming to carry out, and can only produce limited aesthetic effects.

Other efforts have led to a proposal that a jeweler drill a hole in a gem stone and fill it with cremation ashes to be plugged with a sealant material. A method of this type is shown in U.S. Patent Publication No. 2009/0266108, filed Apr. 29, 2008 by Balme. A method of this type requires use of a gem stone which itself is expensive, and the method requires a considerable degree of expertise to drill and fill in the hole without damage to the gem.

Various types of resins have been proposed to encase documents or provide a protective coating over valuables such as gems. What is needed, however, is a convenient and effective means for entrapping cremains for aesthetic display in a keepsake. It is thus, an objective of the present invention to provide a jewelry piece to display a compact, shaped display of cremains through a transparent medium to thus provide an aesthetically pleasing keepsake which can be more sentimental than just a locket or, for instance, glass encased ashes.

SUMMARY OF THE INVENTION

The method of the invention includes flowing resin into a jewelry setting with cremains mixed therein.

BRIEF DESCRIPTION OF THE DRAWINGS

FIG. 12 is a schematic diagram of second method of making the jewelry piece shown in FIG. 10B.

DETAILED DESCRIPTION OF THE PREFERRED EMBODIMENTS

Figure 1:
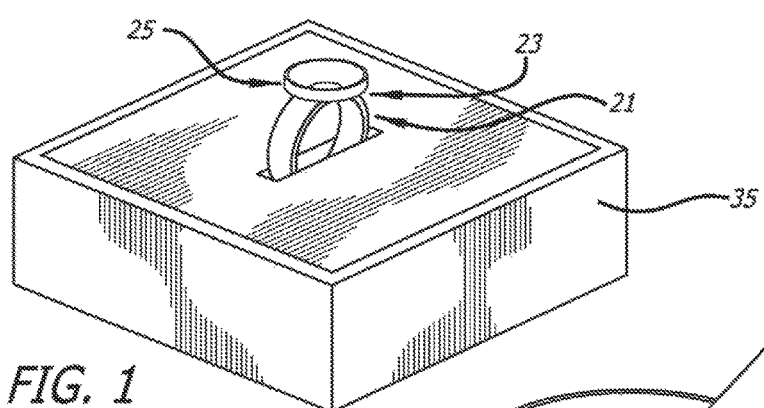
FIG. 1 is a perspective view of a jewelry piece held in a holder and exposing a setting.
Figure 6:
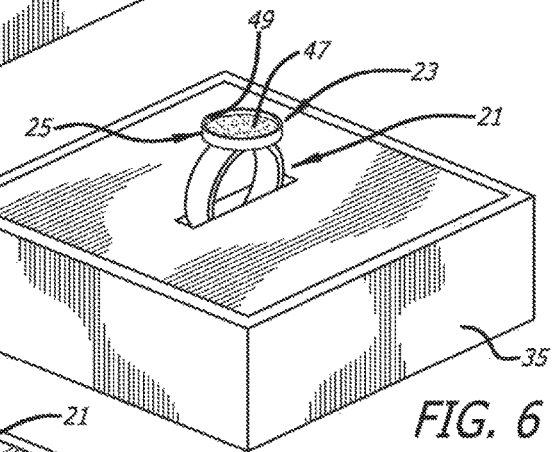
FIG. 6 is a perspective view of the mixture as it hardens in the jewelry setting.

Referring to FIGS. 1 & 6, in one aspect the present invention produces a jewelry piece in the form of a finger ring 21 having a cup-shaped container defining a setting 23 thereon configured with a rim 45 terminating in a free edge 25 to form a central cavity which receives a resin and cremation ash mixture 47.

Cremation ashes may be treated in many different ways, to prepare for the method of the present invention as by utilizing without special treatment or as by grinding with a pestle and maybe screened through a sieve or the like to provide for fine, uniform particles. The ashes themselves often have some coloration to them but may be for the main part of a relatively grey color. For keepsake purposes, many surviving relatives and loved ones have a demand for a keepsake to display the ashes in the natural state and be readily available to be displayed in a discrete and readily viewable state.

Jewelry pieces come in many different forms and are worn as finger rings, bracelets, pendants, hair pieces and many other forms, often having a relatively small setting, a setting which sometime is not of sufficient size to conveniently and effectively receive an operable locket or a meaningful size of molten glass or the like which might enclose or encase cremation ashes.

The settings for finger rings and the like come in many different forms such as in the form of a mount having a bezel strip around the edge which may then be soldered to a gem or the metal worked up over the edge of a stone or the like to retain it in place. Other settings include prong settings which may be bent up around the stone to hold it in place. Even other settings are in the form of channel settings which include two bars or strips of metal that may be linear in shape and which may contain a series of stones. There are also bead settings for setting a stone directly into metal using gravers called burins which are essentially tiny chisels. An even further type of setting is a burnished setting sometimes referred to as a flush setting similar to a bead setting but after the stone has been inserted in place instead of using a graver to lift beads, a burnishing tool is used to push the metal around the edges of the stone to hold it in place. I have found it to be expedient to employ jewelry pieces having a bezel type mount which typically forms a dish-like configuration having side walls which define a cavity into which the mixture of resin, hardener and ash employed in my invention is received.

As will be appreciated by those skilled in the art any piece of jewelry with a recess or the like defining a setting will serve the purpose of my invention, whether the setting is incorporated in a traditional piece of jewelry or maybe even a recess specially formed in a piece of jewelry, it only being important that the recess have a rim made up of sidewalls to contain the flowable resin.

Figure 3:
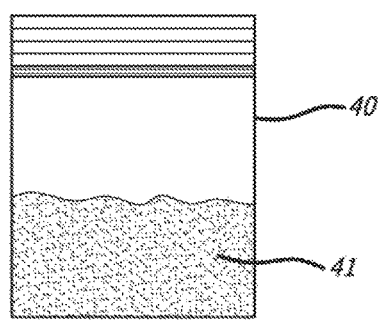
FIG. 3 is a front view of a transparent plastic bag containing cremains.
Figure 4:
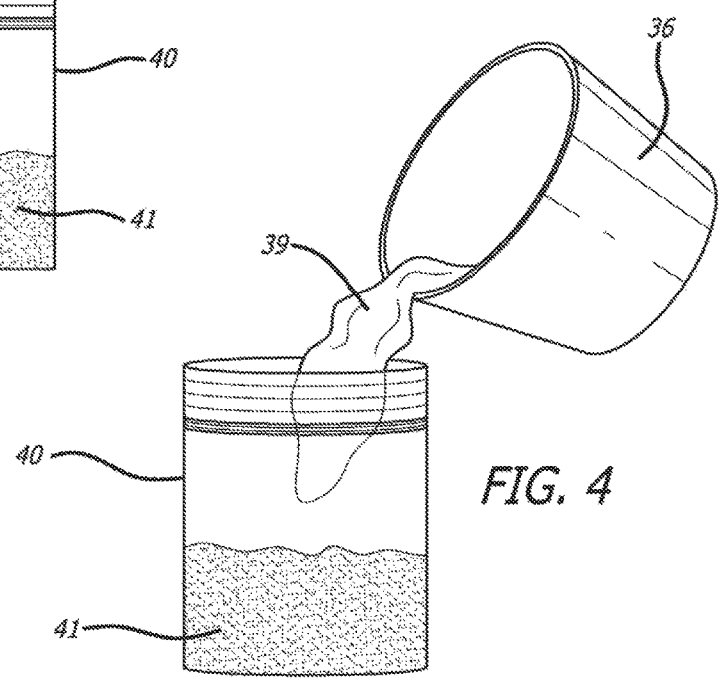
FIG. 4 is a perspective view of liquid resin and hardener being poured into the transparent bag of FIG. 3.

Referring the FIG. 3, as will be appreciated by those skilled in that art, each jewelry memento made in accordance with my invention will produce a custom made piece of jewelry employing the cremains of a loved one or deceased pet.

To acquire the ashes, in some instances I forward a double package of plastic envelopes to a customer for packaging of a small quantity of cremains to be employed in my method. When I receive those cremains. I examine them and, to the extent necessary might grind them into a fine powder and in some instances shake through a sieve or the like to remove any irregular or oversized granules.

The customer might supply a piece of jewelry or select a desired piece such as a linger ring 21. The ring shown in my preferred embodiment includes the setting 23 formed with the peripheral rim 49 to define a cavity of a selected depth for receipt of the mixture to complete the process.

Of course other settings may be employed depending on the preference of the artisan. I may mount the ring in vise or a holder 35 to hold it upright for flowing of resin into the setting 23.

I then mix resin and hardener in, for instance, a container 36 (FIG. 2) utilizing a mixer 37 to provide the desired resin and hardener mixture 39. As will be appreciated by those skilled in the art, many different commercially available resins and hardeners will suffice in this combination. One commercially available epoxy resin I have found satisfactory is clear RAINDROP® epoxy resin available from Rio Grande, 7500 Bluewater Road N.W., Albuquerque, N. Mex. 87121. As will also be appreciated by those skilled in the art, while many different ratios will suffice, I typically select a ratio of 1 to 1 a resin and hardener mixture which will be readily flowable. I have discovered that the ashes and resin may be mixed in various ratios to produce the desired viscosity for the resultant mixture. Ratios I have found desirable are ½ resin/hardener and ½ cremains or ⅓ resin/hardener and ⅔ cremains to produce a thick workable substance, not unlike the texture of cement with, of course, the finer granules.

The resin and hardener mixture 39 and cremains 41 may then be mixed together as by squeezing and manipulating the envelope 40 to form the resin cremains mixture 47. The resin itself may be selected to provide the desired end effect, such as to provide the desired opacity, full transparency, translucence or coloration to enhance the desired viewing effect. In some aspects of my invention the mixing may take place by stirring in a container similar to the container 36.

Figure 5:
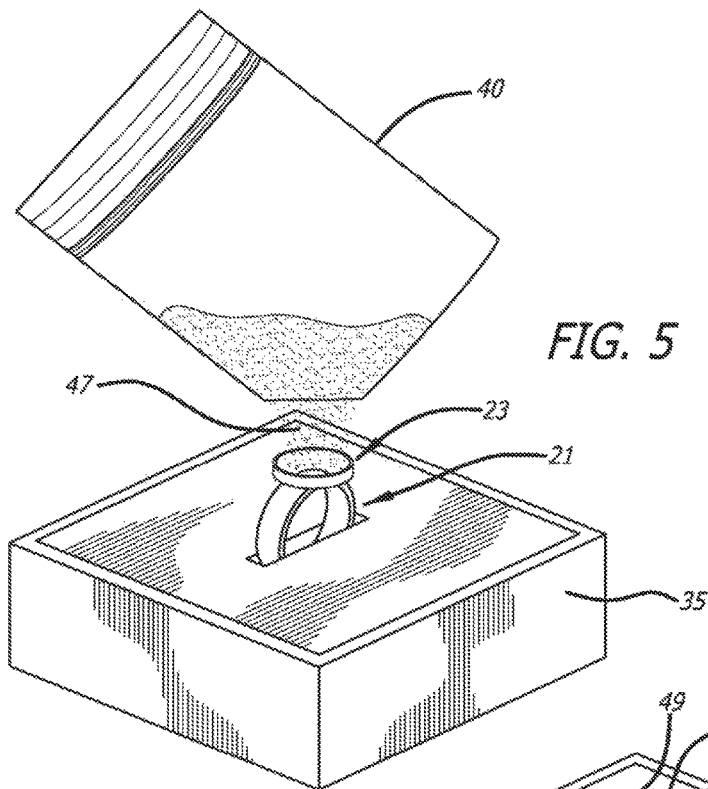
FIG. 5 is a perspective view of the mixture of resin and cremains being piped into the setting shown in FIG. 1.

Once the mixing is complete, the corner of the envelope 40 may be cut off at 45 (FIG. 5) to form a type of funnel or pipe to allow the workman to pipe the mixture of cremains, resin and hardener into the setting 23.

Figure 10A:
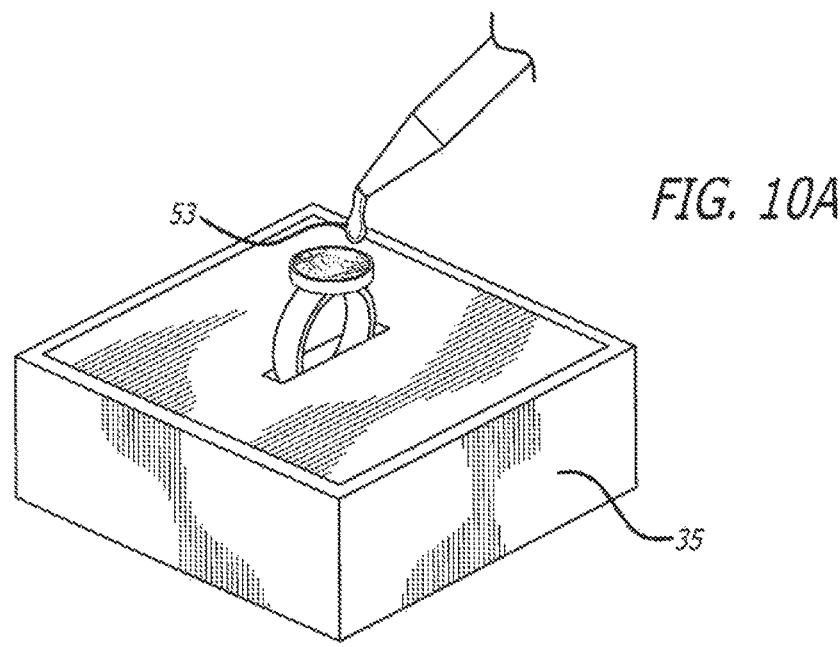
FIG. 10A is a perspective view of the jewelry piece of FIG. 9 as a protective coat is added.
Figure 10B:
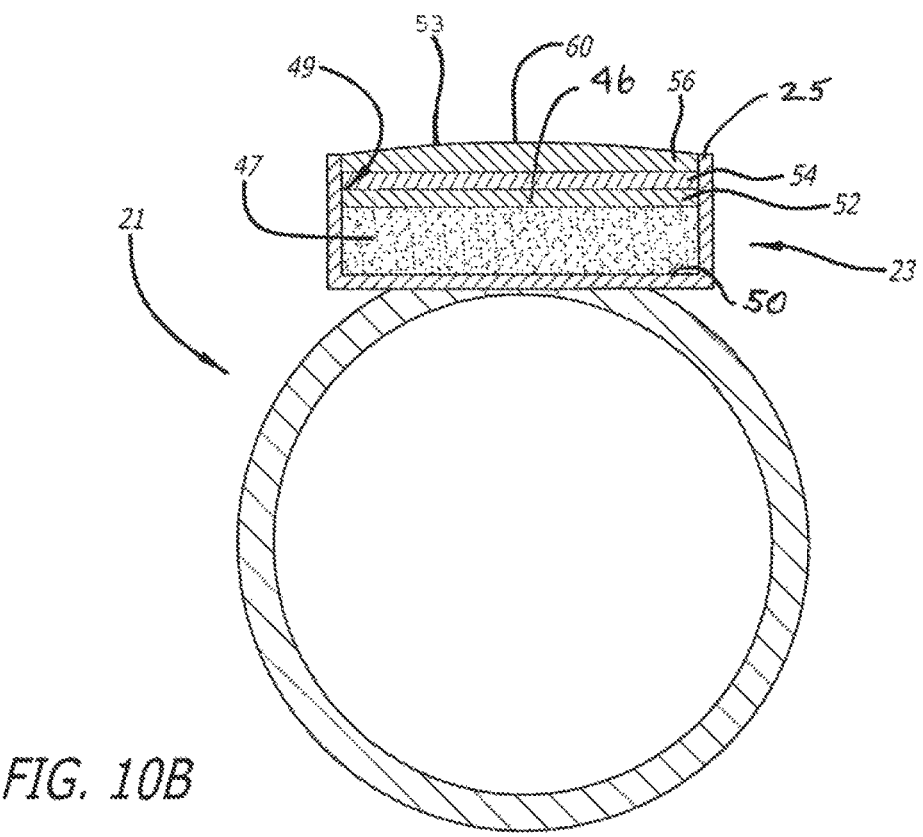
FIG. 10B is a sectional view, in enlarged scale, of the finished ring depicting three protective coatings on the hardened mixture.

In the exemplary embodiment the setting is cup-shaped to be formed with a planar bottom wall 50 (FIG. 10B) and a peripheral wall defining the rim 49. The setting 23 may be filled to within a couple of millimeters or so from the horizontal plane of the edge 25 as shown in FIG. 6 to thus leave a small height of the vertical rim 49 a few millimeters or so above the planar top surface 46 of the mixture 47. I have discovered that with a setting having a relatively flat, planar bottom wall 50, the ashes typically settle downwardly around the periphery of the setting producing a somewhat uniform, circular pattern. As set forth below, in order to add to aesthetics, at this stage of the process, I sometimes stir the mixture during the hardening process to re-distribute the ashes to a more uniform distribution or to form a design such as into a swirl pattern or other non-uniform pattern.

Figure 9A:
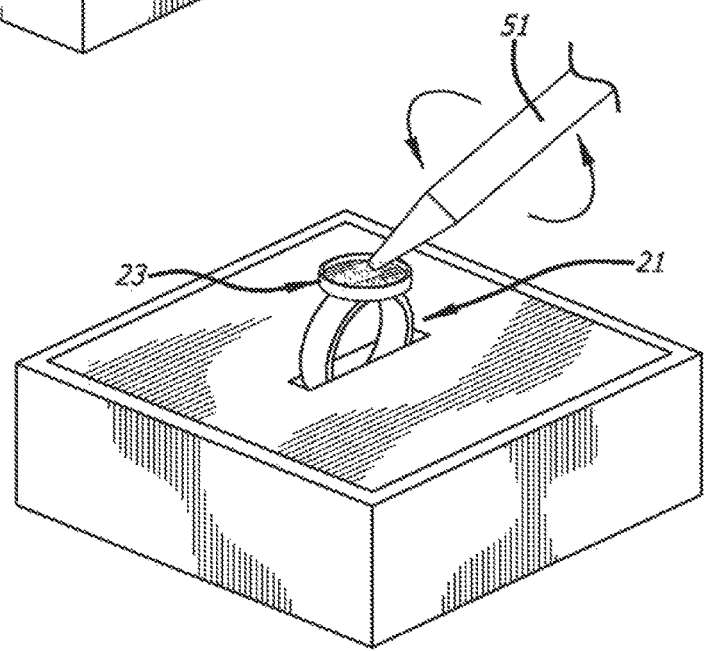
FIG. 9A is a perspective view similar to FIG. 8 but showing the top surface of the mixture being buffed.

In practice, I leave the mixture 47 in the mount 21 for several hours, for instance, four to six hours or in some instances overnight or up to a couple of days to set up and harden. The mixture typically hardens with a sufficiently smooth top surface so that buffing is not necessary. To enhance the finish, however, I sometimes buff the top surface using a buffer 51 (FIG. 9A).

Figure 9B:
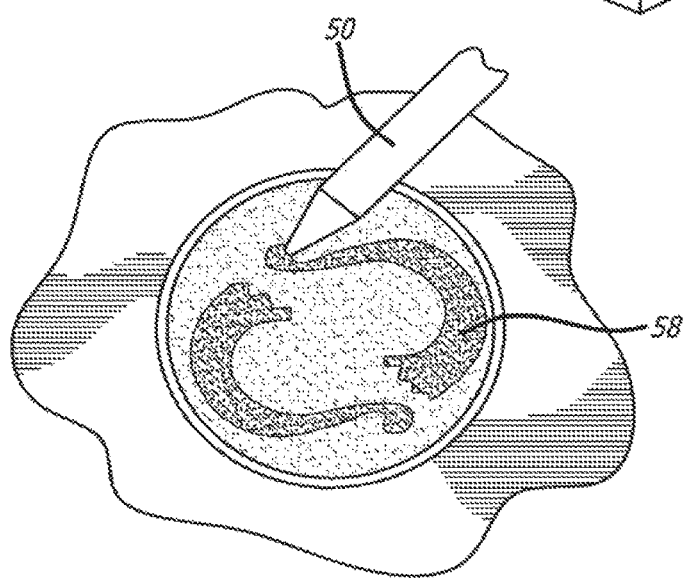
FIG. 9B is a perspective view of the mixture in the setting of FIG. 9A depicting the mixture stirred about to create a design for the ashes.

In another aspect of my invention, to achieve a more uniform distribution of ashes throughout the mixture I mix the cremains with a mixer 47 during the hardening phase (FIG. 9B). This step may be repeated as the hardening progresses.

Figure 7:
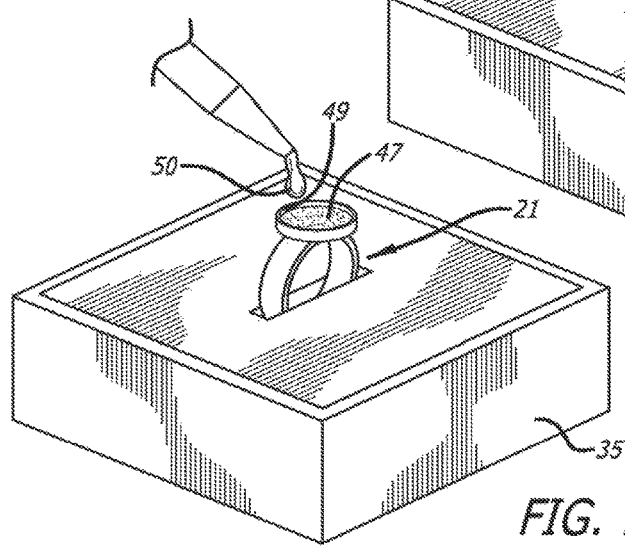
FIG. 7 is a perspective view of a cover layer being applied to the hardened cremains and resin mixture.
Figure 8:
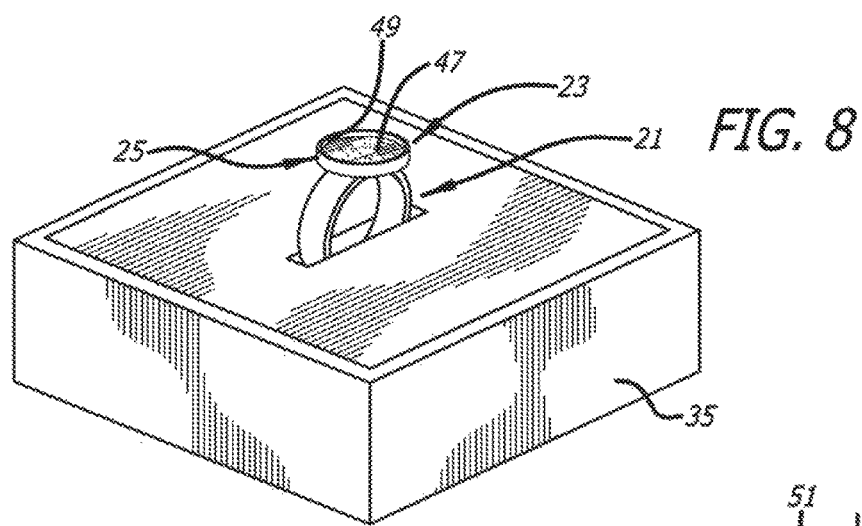
FIG. 8 is a perspective view of the cremains mixture covered by a transparent cover layer as it hardens.

In one aspect, after hardening I add some clear resin and hardener 50 at FIG. 7 to form an additional layer 52 (FIG. 10B) of protective coating over the top surface of the hardened mixture 47. This then is allowed to set up for two or three hours or so and I then add another couple of layers 54 and 56 of the resin and hardener 50 repeating the step of FIG. 7 to thus provide further protective coating and add to the aesthetics. In one of these coatings, I mix some cremation ashes to further add to the aesthetics.

Referring to FIG. 9, for some aspects of the invention I utilize a stir stick 50 (FIG. 9B) to stir the mixture of ashes and resin in the setting 23 during the hardening process to move the ashes around and away from the edge of the bezel. In one aspect I stir the mixture repeatedly, up to 12 times, stopping about 4-6 hours before the mixture fully sets. In another aspect I provide particular designs from the ashes such as a swirl design 58 or the like (FIG. 9B). Thereafter, in some aspects of the invention I apply another clear mixture of resin and hardener at 53 (FIG. 10A) to provide a final finish coat to present a clear transparent protection.

The resultant memento provides a secure, discrete keepsake, attractively displaying the selected cremains. The resin mixture itself, in the hardened state, positively adheres the cremains mixture in the setting.

Figure 11:
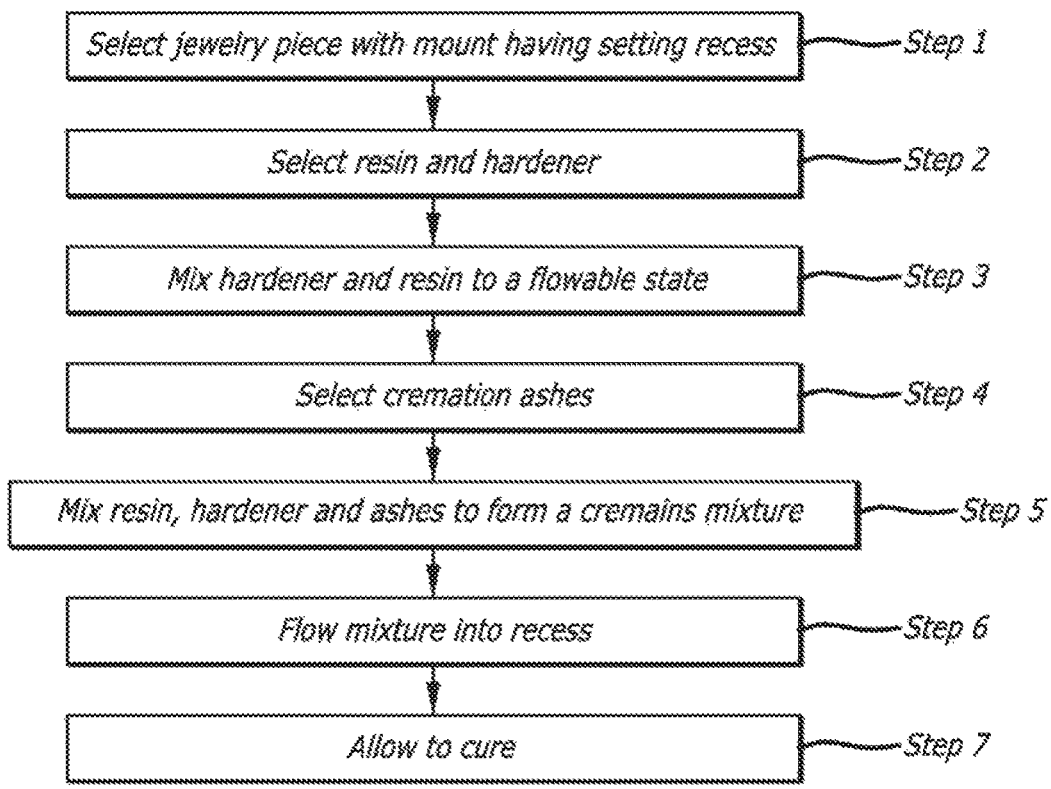
FIG. 11 is a schematic diagram of a method of making the jewelry piece shown in FIG. 6.

Referring the FIG. 11, in the method of the present invention, I prefer to select a of jewelry piece such as a finger ring in step 1 which incorporates a setting having a rim to provide some depth to the recess and oftentimes has a dished bottom so that, even for a small setting having cross section a diameter of ⅜ to ¼ of an inch, there is some volume to the recess for receiving the mixture of my invention. In one preferred embodiment I select jewelry piece like FIG. 1 wherein the rim 49 is continuous and projects entirely around the cavity. These types of settings are often found in readily available finger rings, cufflinks, tie clasps, hair clips, pendants and many other readily available pieces of jewelry known to those skilled in the art.

I have discovered that a preferred ratio of resin and hardeners selected for step 2 of FIG. 11 is 1:1 but other ratios will work, such as 40% to 60% either way. I have discovered that the particular make-up of the resin mixture is effected by temperature and atmospheric conditions so that a set up that works one day may not work so well on another day so it is beneficial to experiment along the way. In some instances I have discovered that the resin/hardener mixture will sometimes take on a coloration, such as yellow, which detracts from the overall aesthetics of the end product so I seek to adjust the procedure accordingly.

Figure 2:
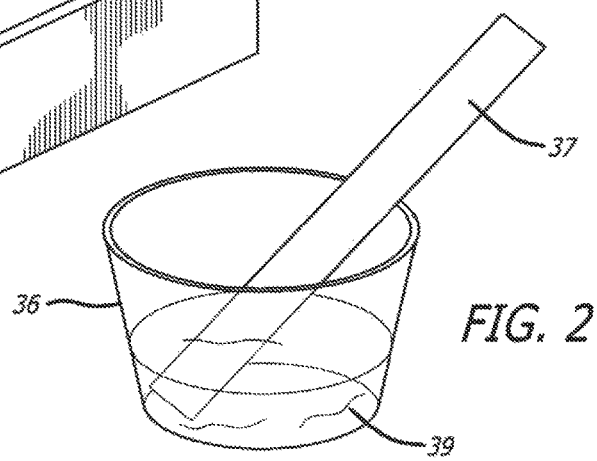
FIG. 2 is a perspective view of resin and hardener being mixed in a container.

In step 3, I mix the resin and hardener in a container 36 as shown in FIG. 2, or sometimes in a baggie or other convenient container.

In practice for step 4, I secure the cremation ashes 41, often times by supplying a customer with a double haggle arrangement so that the customer can double bag the ashes and forward them to me by regular mail or courier.

In some aspects of my invention, I grind the ashes to a finer state than that received and in some instances even filter the ashes through the sieve or the like to provide a uniform powder arrangement which serves to provide a relatively appealing result for the process.

In step 5, for example, I mix the resin and hardener mixture 39 in the baggie 40 containing the ashes 41 to mix the ashes and resin mixture together.

For step 6, I have found it convenient to merely cut off a lower corner of the baggie 40 at 45 (FIG. 5) to provide a convenient piping arrangement to flow the cremation mixture into the recess of the setting 23, typically filling the recess with a mixture 47 to within about a millimeter of the plane of the top edge 25 to leave a section of the rim 49 for additional layers of resin or other protective coating.

At step 7, I allow the cremains mixture to cure for 4-6 hours or sometimes even overnight to provide a hardened mixture in the setting for display or further processing. I have found that the end result at this stage of my method provides a relatively attractive product typically displaying the ashes through the transparency of the resin so that the viewer can readily observe the ashes. I have discovered that the resin actually provides a rather attractive appearance as light is transmitted and reflected through the resin and from the ashes so that there is some coloration providing an enhanced appearance different from a dull grey which is often the case with prior art displays.

I have discovered that the resin mixture can sometimes, depending on the atmospheric conditions, form tiny air bubbles and I sometimes solve this problem by allowing the mixture to set for a time or by adding heat, as by either heating the jewelry piece ahead of time, as for instance, under a faucet of hot water, or sometimes applying a flame torch to the setting to thus dissipate the bubbles and render a more attractive appearance. In some instances, I actually leave the bubbles present to add a somewhat different appearance to the overall product.

As shown in FIG. 12, the method of the present invention in some instances includes stirring or otherwise disturbing the fluid mixture of resin, hardener and cremation ashes to form a design 58. This is accomplished by, before the mixture sets up, inserting a mixing device 50, (FIG. 9B) so that the ashes can be stirred about and raised from their settled position toward the bottom of the recess and guided about the resin mixture to a desired configuration as the mixture progresses toward a hardened state, a state sufficient to support the ashes in their suspended position. One design that has proven popular is a type of circular swirl which is considered attractive by many customers.

In this process, I actually polish the surface of the cured mixture at step 8 of FIG. 12 by a polisher 51 (FIG. 9A) to provide a smooth surface and thereafter apply one or more layers of resin and hardener with or without ashes mixed in to provide an even, smooth protective surface. In the end, I sometimes further polish the top surface after step 11 to be assured that I have a smooth even finish. In one aspect, I fill the setting with a sufficient amount of mixture to leave a crown 60 (FIG. 10B) on the top surface of the mixture or layer, as the case may be.

From my experimentations, I have discovered that this final polishing process is not an essential step and as the top layer tends to settle and cure into a relatively smooth surface without polishing.

From the foregoing, it will be appreciated that the method and memento jewelry piece of the present invention provides a particularly attractive memento displaying the cremation ashes of a loved one or pet in an inexpensive and reliable manner. I have discovered that the resin mixture as it cures actually provides a somewhat wet look to the ashes which adds to the aesthetic of the overall appearance. The coloration is better than many prior art glass encapsulations which often end up with a relatively dull grey look to the ashes themselves.

Although the present invention has been described in detail with regard to the preferred embodiments and drawings thereof, it should be apparent to those of ordinary skill in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention.

I claim:

1. A method of making a jewelry memento including:
selecting a jewelry piece with a setting defining a recess;
selecting a resin and hardener;
mixing the resin and hardener;
selecting cremation ashes;
mixing the resin, hardener and ashes to form a mixture;
flowing the mixture into the recess;
stirring the mixture to distribute the ashes to form a predetermined design within the mixture; and
curing the mixture.

2. The method of claim 1 that includes:
before the ashes mixing step, grinding the ashes.

3. The method of claim 1 that includes:
heating the mixture to remove air bubbles.

4. The method of claim 1 that includes:
heating the jewelry piece to above the atmospheric temperature.

5. The method of claim 1 that includes:
the curing step is between four and six hours.

6. A method of making a jewelry memento including:
selecting a jewelry piece with a setting defining a recess;
selecting a resin and hardener;
mixing the resin and hardener;
selecting cremation ashes;
mixing the resin, hardener and ashes to form a mixture;
flowing the mixture into the recess;
curing the mixture; and
flowing a first protective coating over the mixture in the recess.

7. The method of claim 6 that includes:
after the first protective coating has hardened, flowing a second protective coating over the first coating.

* * * * *